US010383132B2

(12) United States Patent
Chung et al.

(10) Patent No.: US 10,383,132 B2
(45) Date of Patent: Aug. 13, 2019

(54) APPARATUS AND METHOD FOR BLACKLISTING LOCAL CHANNEL IN IOT MULTI-HOP NETWORK

(71) Applicant: Pusan National University Industry—University Cooperation Foundation, Busan (KR)

(72) Inventors: Sanghwa Chung, Busan (KR); Kihoon Jeon, Gimhae-si (KR)

(73) Assignee: Pusan National University Industry—University Cooperation Foundation, Busan (KR)

( * ) Notice: Subject to any disclaimer, the term of this patent is extended or adjusted under 35 U.S.C. 154(b) by 0 days.

(21) Appl. No.: 16/199,395

(22) Filed: Nov. 26, 2018

(65) Prior Publication Data
US 2019/0182846 A1    Jun. 13, 2019

(30) Foreign Application Priority Data

Dec. 12, 2017  (KR) .................. 10-2017-0170547
Jan. 16, 2018  (KR) .................. 10-2018-0005629

(51) Int. Cl.
*H04L 12/28*     (2006.01)
*H04W 72/08*    (2009.01)
(Continued)

(52) U.S. Cl.
CPC ......... *H04W 72/085* (2013.01); *H04L 5/0012* (2013.01); *H04L 5/0057* (2013.01); *H04W 72/082* (2013.01)

(58) Field of Classification Search
CPC .. H04L 5/0057; H04W 72/082; H04W 72/085
(Continued)

(56) References Cited

U.S. PATENT DOCUMENTS

2009/0059814 A1* 3/2009 Nixon ............... H04L 41/12
370/254

FOREIGN PATENT DOCUMENTS

KR   10-2010-0137531 A   12/2010
KR   10-2011-0035126 A    4/2011
(Continued)

OTHER PUBLICATIONS

Korean Office Action for related KR application No. 10-2018-0005629 dated Feb. 20, 2018 from Korean Patent Office.
(Continued)

*Primary Examiner* — John Pezzlo
(74) *Attorney, Agent, or Firm* — Paratus Law Group, PLLC

(57) ABSTRACT

An apparatus for blacklisting a local channel in an Internet-of-Things (IoT) multi-hop network includes: a local blacklist creator configured to create a blacklist based on channel quality estimation (CQE) value; an energy detection performer configured to transmit a scanned received signal strength indicator (RSSI) value to a non-intrusive channel quality measurer; the non-intrusive channel quality measurer configured to calculate channel quality information and transmit the calculated channel quality information to the local blacklist creator; a nearby neighboring node information manager configured to receive a local blacklist from the local blacklist creator and store the local blacklist with a blacklist of a communication partner node; a frequency selector configured to receive a created link mask from the nearby neighboring node information manager and allow for communication considering the link mask in a case of a dedicated slot.

14 Claims, 7 Drawing Sheets

(51) Int. Cl.
*H04L 5/00* (2006.01)
*H04J 1/16* (2006.01)

(58) Field of Classification Search
USPC .......................... 370/252, 278, 329, 386, 442
See application file for complete search history.

(56) References Cited

FOREIGN PATENT DOCUMENTS

| KR | 10-2011-0050022 A | 5/2011 |
| KR | 10-2011-0070702 A | 6/2011 |
| KR | 10-2015-0015265 A | 2/2015 |
| KR | 10-2017-0048937 A | 5/2017 |
| KR | 10-2017-0090932 A | 8/2017 |

OTHER PUBLICATIONS

Korean Notice of Allowance for related KR Application No. 10-2018-0005629 dated Jun. 12, 2018 from Korean Patent Office.

\* cited by examiner

| channel bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| blacklisting | 0 | 0 | 1 | 1 | 1 | 1 | 1 | 0 | 0 | 0 | 0 | 0 | 1 | 1 | 1 | 1 | blacklist information : 0x3E0F (0b0011111000001111)

FIG. 8

$BL_1$
| channel | 14 | 13 | 12 | 11 |
|---|---|---|---|---|
| blacklisting | 1 | 0 | 0 | 0 |

$BL_2$
| channel | 14 | 13 | 12 | 11 |
|---|---|---|---|---|
| blacklisting | 0 | 0 | 0 | 1 |

$LM_{1,2}$
| channel | 14 | 13 | 12 | 11 |
|---|---|---|---|---|
| blacklisting | 1 | 0 | 0 | 1 |

FIG. 9

| Algorithm 1 Frequency Selection |
|---|
| 1: $ch \leftarrow HSL\ [(ASN+\text{channel offset})\%16]$ <br> 2: if current time slot is a slot dedicated to n1 and n2 <br> 3:   while $(ch \in n1.BL_{using})$ or $(ch \in n2.BL_{using})$ do <br> 4:     $ch \leftarrow (ch + 1)\%16$ <br> 5:   end while <br> 6:   return $11 + ch$ <br> 7: else <br> 8:   return $11 + ch$ <br> 9: end if |

FIG. 10

| Algorithm 2 Blacklist exchange of Tx node |
|---|
| 1: when time slot begins, communicate considering local blacklists of Tx and Rx nodes<br>2: $BL_{local}$ ← Latest local blacklist information of Tx node<br>3: Transmit data frame including $BL_{local}$<br>4: if ack frame is successfully received then<br>5:   $BL_{neighbor}$ ← Local blacklist information of Rx node included in ack frame<br>7:   $neighborRow_{RxNode}. BL_{neighbor}$ ← $BL_{neighbor}$<br>8: end if |

FIG. 11

| Algorithm 3 Blacklist exchange of Rx node |
|---|
| 1: when time slot begins, communicate considering local blacklists of Tx and Rx nodes<br>2: if data frame is successfully received then<br>3:   $BL_{local}$ ← Latest local blacklist information of Rx node<br>4:   $BL_{neighbor}$ ← Local blacklist information included in data frame<br>6:   $negihborRow_{TxNode}. BL_{local}$ ← $BL_{local}$<br>7:   $negihborRow_{TxNode}. BL_{neighbor}$ ← $BL_{neighbor}$<br>8: end if |

APPARATUS AND METHOD FOR BLACKLISTING LOCAL CHANNEL IN IOT MULTI-HOP NETWORK

CROSS-REFERENCE TO PRIOR APPLICATIONS

This application claims priority to and the benefit of Korean Patent Application Nos. 10-2017-0170547 filed on Dec. 12, 2017 and 10-2018-0005629 filed on Jan. 16, 2018, the disclosure of which is incorporated herein by reference in its entirety.

BACKGROUND

1. Field of the Invention

The present invention relates to an Internet-of-Things (IoT) multi-hop network, and more particularly, to an apparatus and method for blacklisting a local channel in an IoT multi-hop network, which improve reliability of communication through local channel blacklisting using adaptive channel quality estimation.

2. Discussion of Related Art

A wireless sensor network (WSN) is a network in which sensors are connected and exchange information with each other by enabling sensor modules to communicate wirelessly.

Sensor nodes distributed to measure physical conditions, such as temperature, humidity, weight, and the like, communicate wirelessly with each other. Because wireless communication is more advantageous than wired communication in terms of convenience, cost, and mobility, a WSN is one of technologies playing a key role in the upcoming Internet-of-Things (IoT) paradigm.

IEEE 802.15.4 is a technical standard which defines the physical (PHY) layer and media access control (MAC) layer for low-rate wireless personal area networks (LR-WPANs) and is designed for a multi-hop network and a reliable and low-power wireless communication.

This technology is lightweight and energy-efficient for use in the WSN. Based on this technology, time slotted channel hopping (TSCH) mode of IEEE 802.15.4e, which is a further enhanced standard for the MAC layer, has been introduced.

TSCH is a technique based on time-division multiple access (TDMA) technology, in which a number of nodes synchronized to a network communicate with each other by hopping over several wireless channels. The TSCH aims at operating with a low power and improving reliability and throughput of a WSN in a high noise environment.

In TSCH, time is divided into slots and communication is performed by hopping multiple frequencies. Multi-path fading and external interference are reduced through frequency hopping, thereby ensuring reliability of communication.

In TSCH protocol, 16 channels in the unlicensed 2.4 GHz industrial scientific and medical (ISM) band defined by the IEEE 802.15.4 standard are used. In order to communicate over a specific channel in a specific time slot, nodes need to be synchronized and each node should know a communication schedule thereof.

FIGS. 1 and 2 show the IEEE 802.15.4e TSCH protocol communication mechanism.

In TSCH, two nodes communicate with each other in a predetermined band and a predetermined time period.

That is, a time axis is discretized into time slots and two nodes communicate with each other using a specific channel offset as a medium for a specific timeslot offset.

After a TSCH network starts, one time slot (a specific point in time) is assigned a unique number, which increases by 1 as time passes. This unique number is referred to as an absolute sequence number (ASN) and, according to the standard, an ASN has a size of 5 bytes. A predetermined number of time slots are gathered to form a slot frame, which is continuously repeated.

One link which is determined by a timeslot offset and a channel offset is in the form of an ordered pair of two nodes. One of the two nodes is a transmission node which sends a packet and the other node is a receiving node which receives the packet. In a specific slot offset (in a specific time period), a specific node may take one of the following actions: send a packet, receive a packet, or sleep.

In the IEEE 802.15.4 standard, a total of 16 channels from channel 11 to channel 26 in the 2.4 GHz band are used.

In the TSCH network, a node may have a dedicated slot, which may be realized using scheduling.

For example, in timeslot offset 0 and channel offset 0 in FIG. 2, node B has a schedule for sending a packet to node A and node A has a schedule for receiving a packet from node B.

This is shown in a network graph of FIG. 1. That is, one cell in a scheduling table corresponds to one line in the network graph.

In a general TSCH protocol, a frequency is selected by a blind hopping scheme.

In blind hopping, all frequencies have theoretically the same distribution and a frequency is randomly selected. This may reduce degradation of communication reliability due to the impact of cross-interference or multi-path fading.

A general channel selection scheme used in the TSCH protocol is as shown in Equation 1.

$$\text{Channel} = HSL[(ASN + \text{Channel Offset}) \% 16] \qquad \text{[Equation 1]}$$

Equation 1 enables the channel offset appearing in a schedule to be reflected in a channel to be actually used in communication.

ASN is shared by all of the synchronized nodes and is incremented by 1 each time a time slot increases from the start of the network.

The channel offset may be selected from 0 to 15.

A hopping sequence list (HSL) is a table which stores channels 11 to 26 that are actually available. This indicates that, since the ASN has a unique value during one time slot, it is possible to simultaneously communicate using up to 16 channels at one point in time.

The IEEE 802.15.4e standard contributes to improving reliability of communication, but may be affected by cross-technology interference due to several technologies using 2.4 GHz frequency band.

There are a number of techniques that use the unlicensed 2.4 GHz ISM band, such as Bluetooth, Wi-Fi, a microwave oven, and the like, and many future wireless technologies may use the 2.4 GHz band since this band is an unlicensed band.

The IEEE 802.15.4e standard enables smooth communication by intentionally avoiding a channel that is more prone to interference, through a time slotted channel hopping scheme.

Enhanced TSCH (ETSCH) protocol is the technology that implements such a scheme as a particular policy.

According to the ETSCH protocol, a degree of interference of each channel is measured through energy detection, which can be performed on a radio transceiver, and hops and uses channels of high quality.

ETSCH additionally includes two special schemes in TSCH.

One is a non-intrusive channel quality estimation (NICE) scheme and the other is an enhanced beacon sequence list (EBSL).

In the NICE scheme, for each time slot, energy detection is performed during an idle period which exists in each time slot, thereby measuring a quality of a channel. Channels of high quality are selected on the basis of the measured quality of a channel and the selected channels are alternately used (hopped).

In the NICE scheme, energy detection is performed during the idle period, and thus energy detection can be performed concurrently with communication so that high reliability is ensured even in a dynamic interference environment without impact on a network throughput, such as a time slot.

An enhanced beacon (EB) serves to transmit information for controlling a network to other nodes. The EB transmits an HSL which contains a channel selected by a PAN coordinator. In this case, as an EB loss occurs, an HSL mismatch occurs between nodes, which may degrade reliability. An enhanced beacon sequence list (EBSL) technique is a technique that adopts an EB-dedicated channel list in order to reduce an EB loss.

Examples of an environment to which ETSCH can be applied include a body area network, an in-vehicle network, and so on.

When a vehicle is driven, the in-vehicle network is prone to wireless communication interference from other external networks, such as Wi-Fi, and in particular, a change in quality of a channel is dynamic.

Therefore, the ETSCH, according to which a quality of a channel for each time slot is measured and only a high-quality channel is allowed to be used, has a higher packet delivery ratio (PDR) than that of the existing TSCH in a situation where interference dynamically changes, and thus can provide reliability, and since the ETSCH saves energy consumed on re-transmission due to failure in reception, it is superior to the TSCH in terms of energy consumption.

Performing energy detection in a radio transceiver requires energy consumption. In ETSCH, an HSL containing a high-quality channel selected by performing energy detection in a PAN coordinator based on a star topology is included in the EB and then is transmitted to an end node. Because the PAN coordinator does not need to consider energy consumption, ETSCH may be considered valid.

However, in order for ETSCH to be applied to a wider range of network, a multi-hop network has to be constructed.

In order for ETSCH to be generally extended and applied, not only a PAN coordinator, but also a router node and end nodes are required to perform energy detection.

This is because quality of a wireless channel differs according to a region and it is difficult for the PAN coordinator to perform accurate energy detection over the entire range of the multi-hop network.

In the case of ETSCH, energy detection is performed for each time slot regardless of whether a change of external interference is dynamic, and therefore a general node with limited energy is compelled to unnecessarily consume energy in a network composed of multi-hops.

Hence, if the frequency of energy detection can be adjusted according to whether the change of external interference is dynamic, unnecessary energy consumption can be reduced without deteriorating reliability of communication and it is possible to extend the ETSCH to a multi-hop network scenario.

Meanwhile, a PDR and energy detection are used as methods for measuring a quality of a wireless channel.

Multi-hop and blacklist-based optimized-TSCH (MABO-TSCH) has proposed a local blacklisting scheme based on the PDR by utilizing the multi-armed bandit (MAB) problem.

Since MABO-TSCH uses PDR-based link quality estimation, it is sufficient to distribute a PDR-based blacklist created by one node to another node to be communicated.

When energy detection-based channel quality estimation is used, two nodes need to share their created blacklists and select a communication channel by taking into consideration both one's own blacklist and the other's blacklist.

PRIOR ART DOCUMENTS

Patent Documents

Korean Laid-open Patent Publication No. 10-2010-0137531
Korean Laid-open Patent Publication No. 10-2017-0090932
Korean Laid-open Patent Publication No. 10-2011-0035126

SUMMARY

The present invention aims to solve the above-described problems of an Internet-of-Things (IoT) multi-hop network of the related art and provide an apparatus and method for blacklisting a local channel in an IoT multi-hop network, which improve reliability of communication through local channel blacklisting using adaptive channel quality estimation.

The present invention aims to provide an apparatus and method for blacklisting a local channel in an IoT multi-hop network, which perform energy detection-based channel quality estimation, such as adaptive time slotted channel hopping (ATSCH) or enhanced TSCH (ETSCH), and allows a blacklist to be created through the channel quality estimation using energy detection, thereby excluding a low-quality wireless channel.

Also, the present invention aims to provide an apparatus and method for blacklisting a local channel in an IoT multi-hop network, which adjust a duty cycle for channel quality estimation on the basis of interference dynamicity, thereby preventing unnecessary energy consumption.

In addition, the present invention aims to provide an apparatus and method for blacklisting a local channel in an IoT multi-hop network, which determine how to represent blacklist information by a frequency selection method and include an algorithm for selecting a frequency actually used in communication by use of the blacklist information.

The present invention aims to provide an apparatus and method for blacklisting a local channel in an IoT multi-hop network, which create a blacklist of a communication link formed by two nodes through a blacklist exchange between the two nodes so that a channel is selected by taking into consideration local blacklists of the two nodes.

The present invention aims to provide an apparatus and method for blacklisting a local channel in an IoT multi-hop network, which ultimately extend and apply a non-intrusive channel quality estimation (NICE) scheme of enhanced time slotted channel hopping (ETSCH) to a multi-hop network.

The present invention aims to provide an apparatus and method for blacklisting a local channel in an IoT multi-hop network, which solve an energy consumption problem, extend and apply the NICE scheme to a multi-hop network, and perform wireless channel blacklisting on the basis of the NICE scheme, thereby further improving reliability of communication.

The present invention is not limited hereto, and other objectives not described above will be more clearly understood from what has been set forth hereunder.

In one general aspect, there is provided an apparatus for blacklisting a local channel in an IoT multi-hop network, including: a local blacklist creator configured to create a blacklist on the basis of a channel quality estimation (CQE) value; an energy detection performer configured to transmit a scanned received signal strength indicator (RSSI) value to a non-intrusive channel quality measurer; the non-intrusive channel quality measurer configured to calculate channel quality information and transmit the calculated channel quality information to the local blacklist creator; a nearby neighboring node information manager configured to receive a local blacklist from the local blacklist creator and store the local blacklist together with a blacklist of a communication partner node; a frequency selector configured to receive a created link mask from the nearby neighboring node information manager and allow for communication considering the link mask in a case of a dedicated slot; and an energy detection cycle determiner configured to receive an estimated quality of a channel and determine an energy detection cycle so that energy detection is periodically performed.

2-byte blacklist information in which one bit may be used for each wireless channel, and the blacklist exchange may be performed in which a pair of nodes exchange their own local blacklists with each other.

When the blacklist exchange is performed, a transmission node may send a local blacklist thereof over a data frame and a receiving node may send a local blacklist thereof over an ack frame in order to minimize additionally occurring overhead.

When each of different nodes has its own blacklist created through energy detection, a link mask may be an intersection or union of two blacklists and an actual channel used in communication may be a channel that does not belong to the blacklists of two nodes.

The non-intrusive channel quality estimator may perform energy detection-based channel quality estimation by adjusting a duty cycle for channel quality estimation on the basis of interference dynamicity in order to prevent unnecessary energy consumption.

The CQE value may be obtained as $CQE_\tau(ch) = \alpha ED_\tau(ch) + (1-\alpha)CQE_{\tau-1}(ch)$, wherein $ED_\tau(ch)$ denotes an RSSI value of a specific channel ch at a specific point $\tau$ in time, $CQE\tau(ch)$ denotes a CQE value of the specific channel ch at the specific point $\tau$ in time, an $\alpha$ (exponential smoothing coefficient) value is increased when a currently measured RSSI value is to be more reflected, and the $\alpha$ value is decreased when the RSSI value is to be more stabilized.

When the interference dynamicity for a total of 16 channels from channel 11 to channel 26 is obtained, an amount of change in quality of a specific channel may be calculated as $$ID_\tau = \frac{\sum_{i=11}^{26} \{CQE_\tau(ch_i) - CQE_{\tau-1}(ch_i)\}^2}{ASN_\tau - ASN_{\tau-1}}$$

by obtaining a difference between a currently measured CQE value at the specific channel and a CQE value measured immediately prior. In another general aspect, there is provided a method for blacklisting a local channel in an IoT multi-hop network for adaptive channel quality estimation, the method including: measuring a quality of every channel once with a NICE method when a time slot begins; calculating interference dynamicity for all the channels and determining an energy detection cycle on the basis of the interference dynamicity; and arranging the channels on the basis of a CQE value and creating a blacklist when NICE has been performed on all the channels.

When the energy detection cycle is determined, the NICE may be not performed and wait for the calculated energy detection cycle.

At the time of performing NICE, energy detection-based channel quality estimation may be performed by adjusting a duty cycle for channel quality estimation on the basis of interference dynamicity in order to prevent unnecessary energy consumption.

In still another general aspect, there is provided a method for blacklisting a local channel in an IoT multi-hop network, including: checking whether a time slot is a dedicated slot in a state in which a local blacklist is periodically updated; performing frequency selection referring to a link mask when the time slot is the dedicated slot; in a case of a transmission (Tx) slot dedicated to a node, transmitting blacklist information over a data frame, storing a local blacklist of a partner node, and creating a link mask on the basis of the local blacklist; in a case of a reception (Rx) slot dedicated to a node, storing a local blacklist of the partner node when receiving a data frame, and transmitting a local blacklist of the node over an ack frame.

When the time slot is not the dedicated slot, frequency selection of basic time slotted channel hopping (TSCH) may be performed such that the frequency selection referring to a link mask is performed when a transmission packet is a unicast message and otherwise basic TSCH is performed.

2-byte blacklist information in which one bit may be used for each wireless channel, and a blacklist exchange may be performed in which a pair of nodes exchange their own local blacklists with each other.

When each of the different nodes has its own blacklist created through energy detection, the link mask may be an intersection or union of two blacklists and an actual channel used in communication may be a channel that does not belong to the blacklists of two nodes.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 8 is a table showing a link mask calculation method;

FIG. 9 is a configuration diagram illustrating a frequency selection algorithm;

FIG. 10 is a configuration diagram illustrating a blacklist exchange algorithm for a transmission node; and FIG. 11 is a configuration diagram illustrating a blacklist exchange algorithm for a receiving node.

DETAILED DESCRIPTION

Hereinafter, exemplary embodiments of an apparatus and method for blacklisting a local channel in an Internet-of-Things (IoT) multi-hop network according to the present invention will be described in detail.

Features and advantages of the apparatus and method for blacklisting a local channel in an IoT multi-hop network will be apparent from detailed description of each embodiment below.

Figures 1, 2:
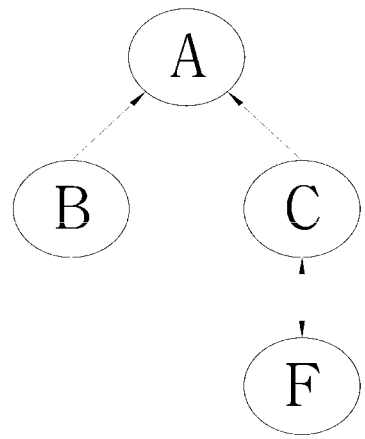
FIG. 1 is a configuration diagram illustrating an example of an IEEE 802.15.4e time slotted channel hopping (TSCH) network topology.
FIG. 2 is a configuration diagram illustrating an example of an IEEE 802.15.4e TSCH communication schedule table.
Figure 3:
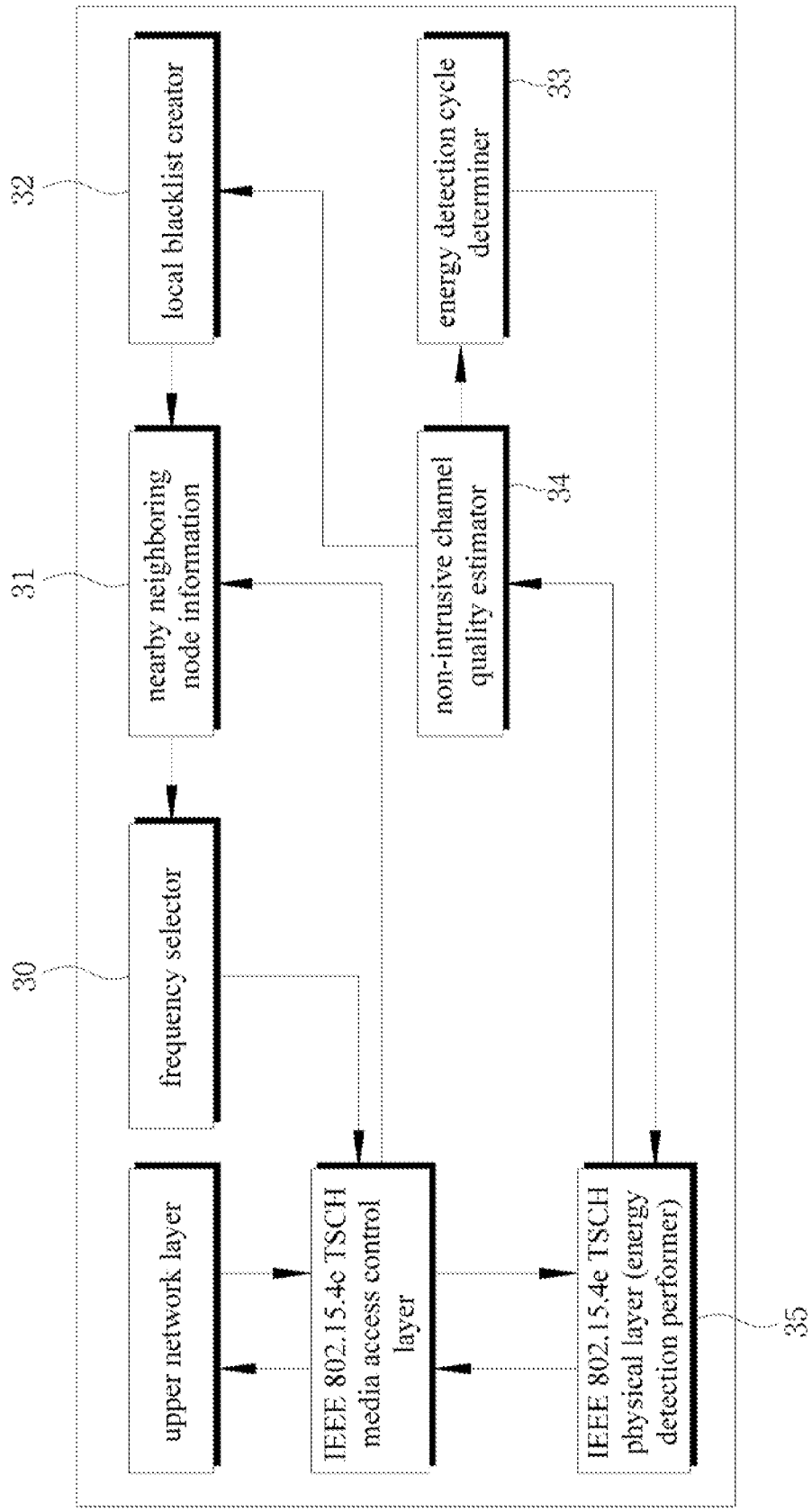
FIG. 3 is a diagram illustrating a configuration of an apparatus for blacklisting a local channel in an Internet-of-Things (IoT) multi-hop network according to the present invention.

FIG. 3 is a diagram illustrating a configuration of an apparatus for blacklisting a local channel in an IoT multi-hop network according to the present invention.

The apparatus and method for blacklisting a local channel in an IoT multi-hop network according to the present invention include a configuration for implementing adaptive channel estimation (ACE) blacklisting-based time slotted channel hopping (ACEB-TSCH) by using 2-byte blacklist information, in which one bit is used for each wireless channel, and utilizing a configuration for selectively constructing a link-associated blacklist and frequency, a blacklist exchange configuration for exchanging local blacklists between a pair of nodes, adaptive channel quality estimation (ACQE), and a local channel blacklisting technique.

The present invention performs energy detection-based channel quality estimation, such as adaptive TSCH (ATSCH) or enhanced TSCH (ETSCH), and allows a blacklist to be created through the channel quality estimation using energy detection, thereby excluding a low-quality wireless channel. Also, the present invention adjusts a duty cycle for channel quality estimation on the basis of interference dynamicity, thereby preventing unnecessary energy consumption.

In addition, how blacklist information is represented is determined by a frequency selection method, an algorithm for selecting a frequency actually used in communication by use of the blacklist information is included, and a blacklist of a communication link formed by two nodes is created by a blacklist exchange between the two nodes so that a channel may be selected by taking into consideration local blacklists of the two nodes.

The structures of a communication layer and a performer of a networking apparatus according to the present invention will be described below.

As shown in FIG. 3, a local blacklist creator 32 configured to arrange channels on the basis of channel quality estimation (CQE) values and create a blacklist for excluding channels of low quality, an energy detection performer 35 configured to transmit a scanned received signal strength indicator (RSSI) value to an non-intrusive channel quality estimator 34, the non-intrusive channel quality estimator 34 configured to calculate channel quality information and transmit the channel quality information to the local blacklist creator 32, a nearby neighboring node information manager 31 configured to receive a local blacklist from the local blacklist creator 32 and store the received local blacklist together with a blacklist of a communication partner node, a frequency selector 30 configured to receive a created link mask from the nearby neighboring node information manager 31 and allow for communication considering the link mask in the case of a dedicated slot, and an energy detection cycle determiner 33 configured to receive an estimated quality of a channel and determine an energy detection period so that energy detection may be periodically performed.

The RSSI value scanned by the energy detection performer 35 is transmitted to the non-intrusive channel quality estimator 34 and is used for estimating a quality of a channel.

The energy detection cycle determiner 33 receives the estimated quality of a channel and determines an energy detection period to periodically perform energy detection.

The channel quality calculated by the non-intrusive channel quality estimator 34 is transmitted to the local blacklist creator 32 and is used for creating the local blacklist. The local blacklist is paired with a blacklist of a communication partner node and stored in the neighboring node information, and is used for creating the link mask.

The created link mask is transmitted to the frequency selector 30 so that communication is performed considering the link mask in the case of a dedicated slot.

The CQE value may be obtained by Equation 2.

$$CQE_\tau(ch) = \alpha ED_\tau(ch) + (1-\alpha)CQE_{\tau-1}(ch) \quad \text{[Equation 2]}$$

The energy detection performer 35 may measure an RSSI value through energy detection and may calculate the CQE value as shown in Equation 2.

$ED_\tau(ch)$ denotes an RSSI value of a specific channel ch at a specific point $\tau$ in time.

$CQE_\tau(ch)$ denotes a CQE value of the specific channel ch at the specific point $\tau$ in time.

An $\alpha$ (exponential smoothing coefficient) value may be increased when a currently measured RSSI value is to be more reflected, and the $\alpha$ value may be decreased when the RSSI value is to be more stabilized.

Interference dynamicity is a measure for determining whether the change of interference is dynamic based on the CQE value, and may be obtained as shown in Equation 3.

$$ID_\tau = \frac{\sum_{i=11}^{26} \{CQE_\tau(ch_i) - CQE_{\tau-1}(ch_i)\}^2}{ASN_\tau - ASN_{\tau-1}} \quad \text{[Equation 3]}$$

$ASN_\tau$ denotes an absolute sequence number (ASN) value at a point $\tau$ in time at which the interference dynamicity is measured and $ASN_{\tau-1}$ denotes an ASN value at a point $\tau$ in time at which interference dynamicity was previously measured.

For a specific channel, an immediately previously measured CQE value is subtracted from the currently measured CQE value. An absolute value of the resulting difference of the CQE values is the amount of change in quality of the specific channel.

The above process is performed on the total of 16 channels from channel 11 to channel 26 and the sum of the amounts of change in quality of the channels is obtained. In addition, the number of time slots (measurement time interval) in a period from the point in time at which the current CQE value is measured to the point in time at which the immediately previous CQE value is measured may be obtained by subtracting an absolute slot number (ASN) at the point in time of previous measurement from an ASN at the point in time of current measurement. The sum of amounts of change in quality of channels is divided by the measurement time interval, thereby considering time in the total amount of change in the CQE value.

In summary, Equation 3 indicates the total amount of CQE values of 16 channels changed during a specific period of time. When the calculated interference dynamicity is large, the change of wireless interference is dynamic, and when the calculated interference dynamicity is small, the change of wireless interference is not dynamic.

A method for blacklisting a local channel in an IoT multi-hop network according to the present invention will be described below in detail.

Figure 4:
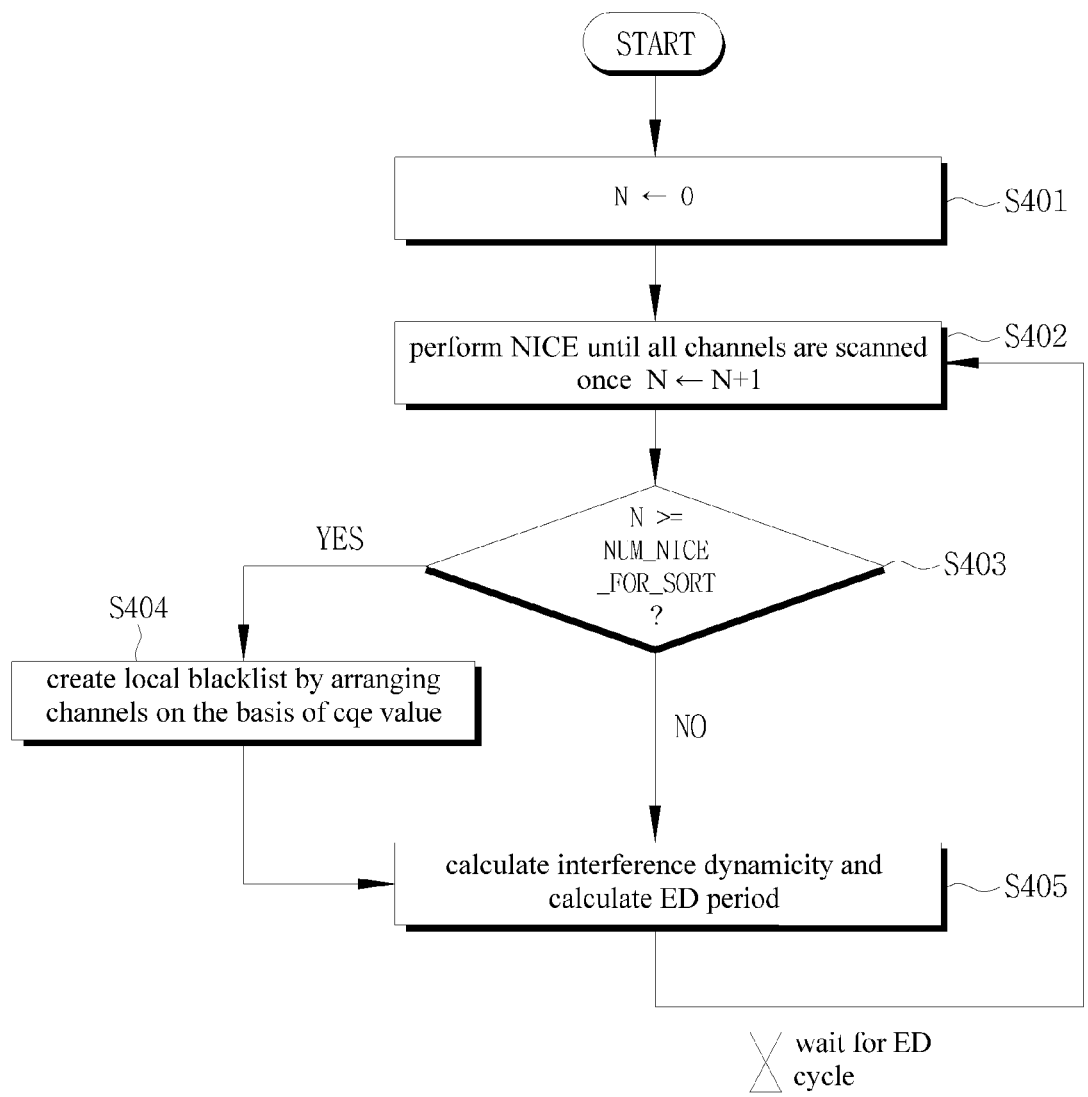
FIG. 4 is a flowchart illustrating an adaptive channel quality estimation method according to the present invention.
Figure 5:
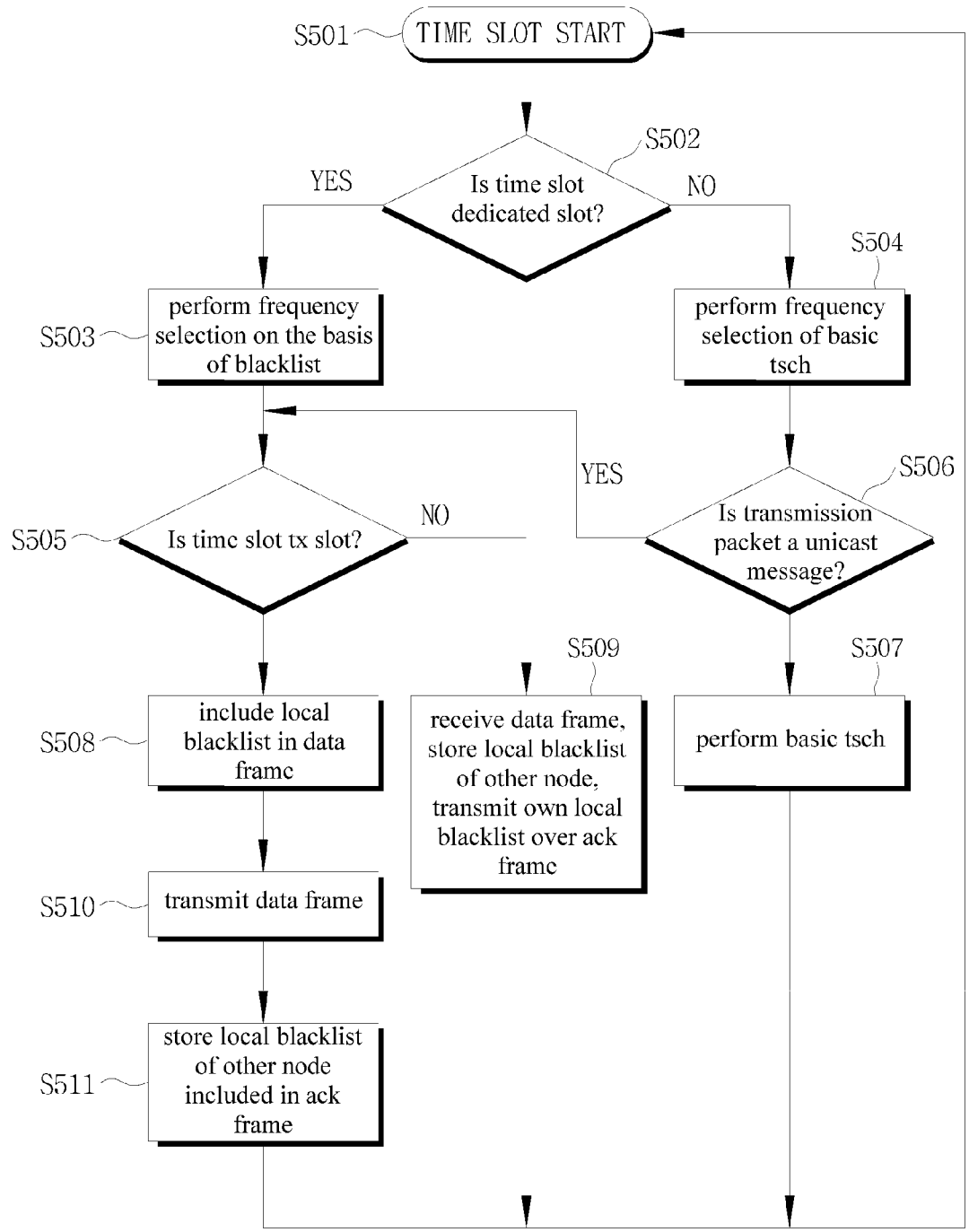
FIG. 5 is a flowchart illustrating a method for blacklisting a local channel in an IoT multi-hop network according to the present invention.

FIG. 4 is a flowchart illustrating an adaptive channel quality estimation method according to the present invention, and FIG. 5 is a flowchart illustrating a method for blacklisting a local channel in an IoT multi-hop network according to the present invention.

In the adaptive channel quality estimation method according to the present invention, when a process starts (S401), non-intrusive channel-quality estimation (NICE) is performed (S402) until the quality of all of 16 channels once (S403).

It takes 8 time slots to measure the quality of every channel once.

Then, interference dynamicity of every channel is calculated and an energy detection cycle is determined on the basis of the interference dynamicity (S405).

Then, the process waits for the calculated energy detection cycle without performing the NICE.

N and NUM_NICE_FOR_SORT in the flowchart are related to the number of times of NICE for all channels. N increases by one each time energy detection of 16 channels is performed. When N reaches NUM_NICE_FOR_SORT, the channels are arranged on the basis of the CQE value to create a blacklist for excluding channels of low quality (S404).

This indicates that blacklisting is periodically performed.

FIG. 5 is a flowchart illustrating operations of ACEB-TSCH and showing creation of a local blacklist which utilizes ACQE.

In a state in which a local blacklist is periodically updated (S501), ACEB-TSCH checks whether a time slot is a dedicated time slot (S502).

In a dedicated time slot, a unicast packet is unconditionally transmitted. In the case of a dedicated time slot, frequency selection referring to a link mask is performed (S503).

In the case of a Tx slot dedicated to a node (S505), 2-byte blacklist information is contained in a data frame (S508) and the data frame is transmitted (S510).

Then, a local blacklist of a partner node included in an ack frame is stored, which is used to create a link mask (S511).

In the case of an Rx slot dedicated to a node, the node receives a data frame, stores a local blacklist of a partner node when receiving the data frame, and transmits a local blacklist of the node over an ack frame (S509).

In operation S502, when the time slot is not a dedicated slot, frequency selection of basic TSCH is performed (S504). When a transmission packet is a unicast message (S506), frequency selection referring to the link mask is performed, and otherwise, basic TSCH is performed (S507).

The present invention with the above-described configuration enables adaptive channel quality estimation which adjusts a duty cycle for energy detection and ACEB-TSCH which includes local channel blacklisting performed on each link between energy detection-based nodes.

Through the ACEB-TSCH, the NICE scheme of ETSCH may be extended to a multi-hop network scenario, such as industrial IoT multi-hop networks.

As the IoT paradigm accelerates, a number of technologies that use the unlicensed 2.4 GHz industrial scientific and medical (ISM) band of IEEE 802.15.4 will emerge and various wireless techniques are expected to be introduced into the industry. Thus, it is obvious that cross-technology interference becomes more severe in an industrial IoT multi-hop network environment. The ACEB-TSCH may improve communication reliability by excluding low-quality wireless channels in a general industrial network.

Major concepts and objectives of the ACEB-TSCH are as follows.

Energy detection-based channel quality estimation, such as ATSCH or ETSCH, is performed so that a blacklist may be created through channel quality estimation using energy detection.

The present invention adjusts a duty cycle for channel quality estimation on the basis of interference dynamicity, thereby preventing unnecessary energy consumption.

The present invention determines how to represent blacklist information with frequency selection and devises an algorithm to select a frequency to be actually used in a communication by using the blacklist information.

In the present invention, in order to create a blacklist of a communication link formed by two nodes, a channel needs to be selected by taking into account local blacklists of the two nodes.

Since a quality of wireless channel depends on the space where the wireless channel is placed, it is necessary to manage a link-associated blacklist in a distributed manner according to regions where a pair of nodes willing to communicate are located.

In the present invention, in order to implement local channel blacklisting, a scheme for blacklist information representation, a scheme for calculating a link-associated blacklist, a scheme for selecting a frequency to be used in communication by considering a blacklist, and a scheme for managing a blacklist in a distributed manner are considered.

First, the blacklist information is described below.

There may be many methods for representing the blacklist information.

The present invention uses 2-byte blacklist information in which one bit is used for each wireless channel.

Figures 6, 7:
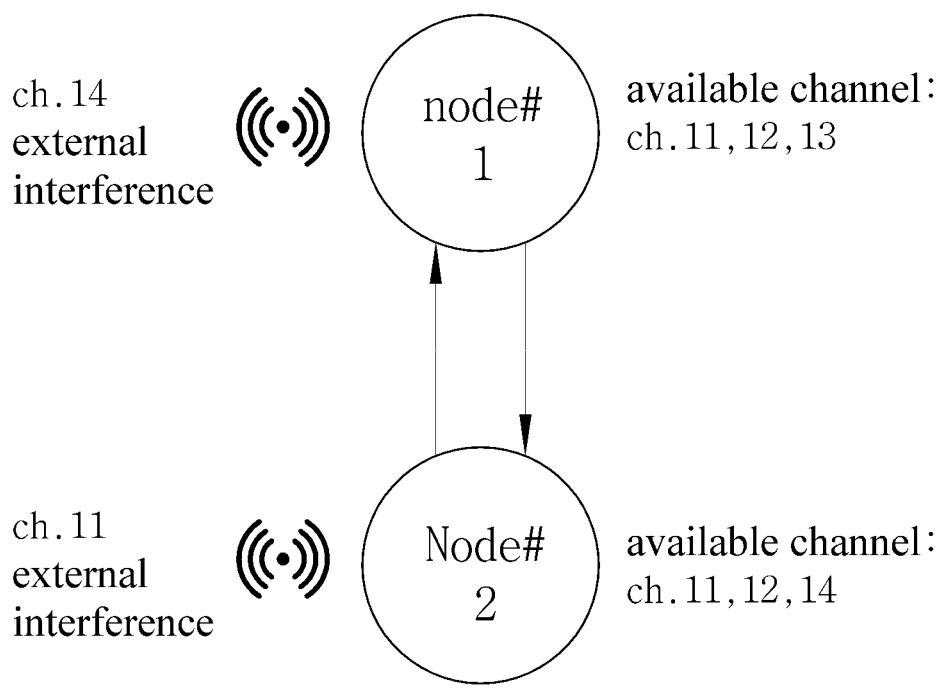
FIG. 6 is a table showing an example of blacklist information.
FIG. 7 is a configuration diagram illustrating an example in which nodes have different blacklists.

FIG. 6 is a table showing an example of blacklist information.

Each bit in 2-byte blacklist information indicates whether a corresponding channel is in a blacklist. When the corresponding channel is in the blacklist, the bit has a value of "1," and when the corresponding channel is not in the blacklist, the bit has a value of "0." Each node arranges CQE values measured through channel quality estimation using energy detection and performs communication by excluding (blacklisting) n channels of low quality.

A link-associated blacklist and frequency selection will be described below.

A link-associated blacklist adopts a concept of a link mask proposed in ATSCH.

The link mask has a prerequisite that a partner node willing to communicate is not guaranteed to have a CQE value identical to a CQE value measured at a current node.

FIG. 7 is a configuration diagram illustrating an example in which nodes have different blacklists.

Assuming that a blacklist length is 1 and there are four channels, channels 11 to 14, since node 1 is affected by external interference from nearby channel 14, channel 14 is included in a blacklist and the available channels are channel 11, channel 12, and channel 13.

Since node 2 is affected by external interference from nearby channel 11, channel 11 is included in a blacklist and the available channels are channel 12, channel 13, and channel 14. As such, although the two nodes are placed nearby, the blacklists created by each node may be different.

When the two nodes have their own local blacklists created through energy detection, a link mask is the intersection or union of the two blacklists.

The actual channel to be used in communication should be a channel that does not belong to the blacklists of the two nodes.

That is, a channel having a corresponding bit of "0" in the link mask is used as a communication channel.

However, since the link mask that is the union of the blacklists of the two nodes may cause exhaustion of channel resources, the size of the blacklist should be limited to less than 8.

In the present invention, the length of the blacklist is set to be less than 8, and the link mask is calculated as the union of blacklists of the two nodes, as shown in Equation 4.

FIG. 8 illustrates an example in which a link mask is calculated using Equation 4.

$$LM_{1,2} = BL_1 \cup BL_2 \quad \text{[Equation 4]}$$

Further, a frequency may be selected using the created link mask.

FIG. 9 is a configuration diagram illustrating a frequency selection algorithm.

First, a channel is selected in a manner as selected by a general TSCH protocol, and then it is determined whether a current time slot is a slot dedicated to the node.

In the case of a dedicated slot, a channel having a corresponding bit of "0" in a link mask, i.e., a channel of high quality, is found while a channel is incremented by 1, and communication is performed by selecting the found channel.

When the current time slot is not a dedicated slot, a channel selection method of the general TSCH protocol is performed.

Further, a blacklist exchange will be described below.

FIG. 10 is a configuration diagram illustrating a blacklist exchange algorithm for a transmission node, and FIG. 11 is a configuration diagram illustrating a blacklist exchange algorithm for a receiving node.

The blacklist exchange algorithms enable a pair of nodes to exchange their own local blacklists with each other.

In this case, in order to minimize additional overhead incurred in exchanging blacklists, the blacklists are transmitted over unicast which occurs in a user datagram protocol (UDP) data packet, which is already generated, or in a control packet sent to improve or maintain a path in a routing protocol, such as Routing Protocol for Low-power Lossy Networks (RPL).

In the unicast, when the transmission node sends a data frame, the receiving node receives the data frame and then sends an ack frame.

The blacklist exchange algorithms are operated such that the transmission node sends the local blacklist thereof over the data frame and the receiving node sends the local blacklist thereof over the ack frame.

The apparatus and method for blacklisting a local channel in an IoT multi-hop network according to the present invention as described above perform energy detection-based channel quality estimation, such as ATSCH or ETSCH, and creates a blacklist through the channel quality estimation using energy detection, thereby excluding a wireless channel of low quality. In addition, the apparatus and method adjust a duty cycle for channel quality estimation on the basis of interference dynamicity, thereby preventing unnecessary energy consumption.

In addition, how blacklist information is represented is determined by a frequency selection method, an algorithm for selecting a frequency actually used in communication by use of the blacklist information is included, and a blacklist of a communication link formed by two nodes is created by a blacklist exchange between the two nodes so that a channel can be selected by taking into consideration local blacklists of the two nodes.

As described above, the apparatus and method for blacklisting a local channel in an IoT multi-hop network according to the present invention have the following effects.

First, it is possible to improve reliability of communication through local channel blacklisting using ACQE.

Second, energy detection-based channel quality estimation is performed so that a blacklist can be created through the channel quality estimation using energy detection, thereby excluding a wireless channel of low quality.

Third, a duty cycle for channel quality estimation on the basis of interference dynamicity is adjusted, thereby preventing unnecessary energy consumption.

Fourth, how blacklist information is represented is determined by a frequency selection method and a frequency actually used in communication is selected using the blacklist information, and thus a communication network can be effectively used.

Fifth, a blacklist of a communication link formed by two nodes is created through a blacklist exchange between the two nodes, and thus a channel can be effectively selected by taking into account local blacklists of the two nodes.

Sixth, it is possible to ultimately extend and apply a NICE scheme of ETSCH to a multi-hop network.

Seventh, an energy consumption problem is solved, the NICE scheme is extended and applied to a multi-hop network, and wireless channel blacklisting is performed on the basis of the NICE scheme, thereby further improving reliability of communication.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for blacklisting a local channel in an Internet-of-Things (IoT) multi-hop network, comprising:
   a local blacklist creator configured to create a blacklist on the basis of a channel quality estimation (CQE) value;
   an energy detection performer configured to transmit a scanned received signal strength indicator (RSSI) value to a non-intrusive channel quality measurer;
   the non-intrusive channel quality measurer configured to calculate channel quality information and transmit the calculated channel quality information to the local blacklist creator;
   a nearby neighboring node information manager configured to receive a local blacklist from the local blacklist creator and store the local blacklist together with a blacklist of a communication partner node;
a frequency selector configured to receive a created link mask from the nearby neighboring node information manager and allow for communication considering the link mask in a case of a dedicated slot; and
an energy detection cycle determiner configured to receive an estimated quality of a channel and determine an energy detection cycle so that energy detection is periodically performed.

2. The apparatus of claim 1, wherein 2-byte blacklist information in which one bit is used for each wireless channel, and a blacklist exchange is performed in which a pair of nodes exchange their own local blacklists with each other.

3. The apparatus of claim 2, wherein, when the blacklist exchange is performed, a transmission node sends a local blacklist thereof over a data frame and a receiving node sends a local blacklist thereof over an ack frame in order to minimize additionally occurring overhead.

4. The apparatus of claim 1, wherein, when each of different nodes has its own blacklist created through energy detection, a link mask is an intersection or union of two blacklists and an actual channel used in communication is a channel that does not belong to the blacklists of two nodes.

5. The apparatus of claim 1, wherein the non-intrusive channel quality estimator performs energy detection-based channel quality estimation by adjusting a duty cycle for channel quality estimation on the basis of interference dynamicity.

6. The apparatus of claim 1, wherein the CQE value is obtained as $CQE_\tau(ch)=\alpha ED_\tau(ch)+(1+\alpha)CQE_{\tau-1}(ch)$, wherein $ED_\tau(ch)$ denotes an RSSI value of a specific channel ch at a specific point $\tau$ in time, $CQE_\tau(ch)$ denotes a CQE value of the specific channel ch at the specific point $\tau$ in time, an $\alpha$ (exponential smoothing coefficient) value is increased when a currently measured RSSI value is to be more reflected, and the $\alpha$ value is decreased when the RSSI value is to be more stabilized.

7. The apparatus of claim 6, wherein when the interference dynamicity for a total of 16 channels from channel 11 to channel 26 is obtained, an amount of change in quality of a specific channel is calculated as $$ID_\tau = \frac{\sum_{i=11}^{26} \{CQE_\tau(ch_i) - CQE_{\tau-1}(ch_i)\}^2}{ASN_\tau - ASN_{\tau-1}}$$

by obtaining a difference between a currently measured CQE value at the specific channel and a CQE value measured immediately prior, wherein $ASN_\tau$ denotes an absolute sequence number (ASN) value at a point $\tau$ in time at which the interference dynamicity is measured and $ASN_{\tau-1}$ denotes an ASN value at a point in time at which interference dynamicity was previously measured.

8. A method for blacklisting a local channel in an Internet-of-Things (IoT) multi-hop network for adaptive channel quality estimation, the method comprising:
measuring a quality of every channel once with a non-intrusive channel estimation (NICE) method when a time slot begins;
calculating interference dynamicity for all the channels and determining an energy detection cycle on the basis of the interference dynamicity; and
arranging the channels on the basis of a channel quality estimation (CQE) value and creating a blacklist when NICE has been performed on all the channels.

9. The method of claim 8, wherein, when the energy detection cycle is determined, the NICE is not performed and waits for the calculated energy detection cycle.

10. The method of one of claim 8, wherein, at the time of performing NICE, energy detection-based channel quality estimation is performed by adjusting a duty cycle for channel quality estimation on the basis of interference dynamicity.

11. A method for blacklisting a local channel in an Internet-of-Things (IoT) multi-hop network, comprising:
checking whether a time slot is a dedicated slot in a state in which a local blacklist is periodically updated;
performing frequency selection referring to a link mask when the time slot is the dedicated slot;
in a case of a transmission (Tx) slot dedicated to a node, transmitting blacklist information over a data frame, storing a local blacklist of a partner node, and creating a link mask on the basis of the local blacklist; and
in a case of a reception (Rx) slot dedicated to a node, storing a local blacklist of the partner node when receiving a data frame, and transmitting a local blacklist of the node over an ack frame.

12. The method of claim 11, wherein, when the time slot is not the dedicated slot, frequency selection of basic time slotted channel hopping (TSCH) is performed such that the frequency selection referring to a link mask is performed when a transmission packet is a unicast message and otherwise basic TSCH is performed.

13. The method of claim 11, wherein 2-byte blacklist information in which one bit is used for each wireless channel, and a blacklist exchange is performed in which a pair of nodes exchange their own local blacklists with each other.

14. The method of claim 11, wherein, when each of the different nodes has its own blacklist created through energy detection, the link mask is an intersection or union of two blacklists and an actual channel used in communication is a channel that does not belong to the blacklists of two nodes.

* * * * *